W. D. NICKUM & M. CLAUSSEN.
PNEUMATIC CLUTCH CONTROLLER.
APPLICATION FILED MAY 10, 1911.
1,018,772.
Patented Feb. 27, 1912.
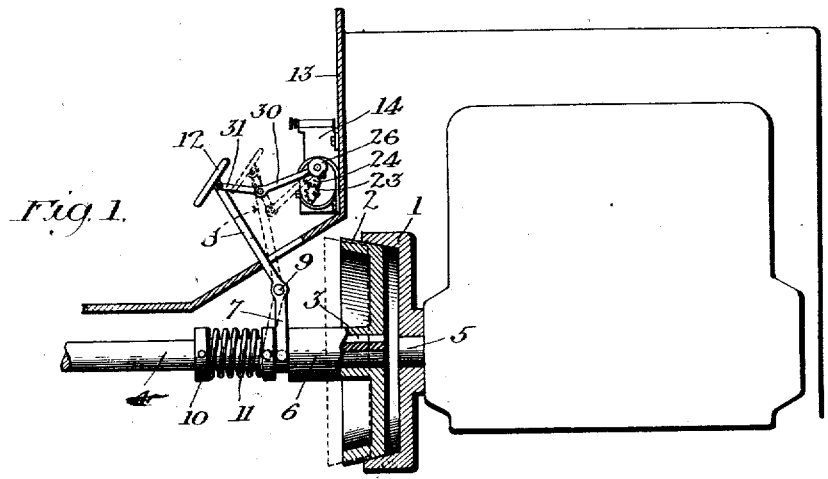
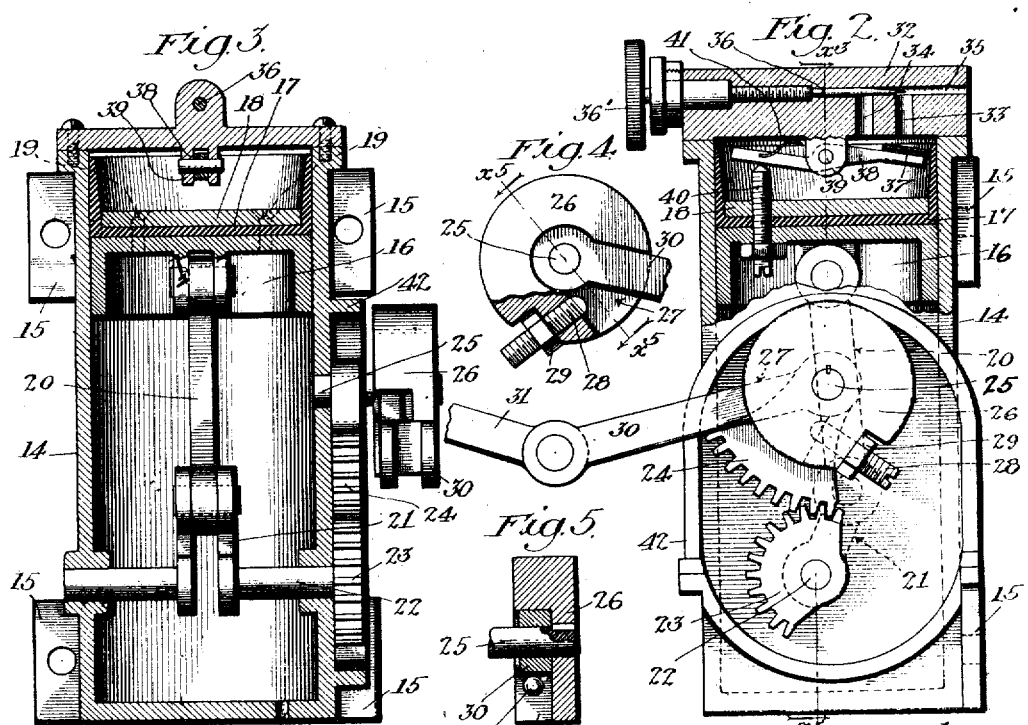

UNITED STATES PATENT OFFICE.

WALTER D. NICKUM AND MARTIN CLAUSSEN, OF LOS ANGELES, CALIFORNIA.

PNEUMATIC CLUTCH-CONTROLLER.

1,018,772.  Specification of Letters Patent.  Patented Feb. 27, 1912.

Application filed May 10, 1911. Serial No. 626,355.

*To all whom it may concern:*

Be it known that we, WALTER D. NICKUM and MARTIN CLAUSSEN, both citizens of the United States, residing at Los Angeles, in the county of Los Angeles and State of California, have invented a new and useful Pneumatic Clutch-Controller, of which the following is a specification.

This invention relates to a device which is adapted to be connected to the clutch lever for permitting the clutch lever to be moved freely in one direction to release the clutch, but which will cause the clutch lever to move slowly in the other direction in moving in the clutch, thereby preventing the clutch from too suddenly engaging and causing shock to the mechanism. The pneumatic controlling device causes the engaging movement of the clutch to automatically take place gradually without any effort on the part of the operator whose foot, if desired, may be suddenly removed from the clutch lever as soon as he desires the clutch to be engaged and the engaging movement will take place automatically at the proper speed for gradually clutching the members of the clutch and bringing the driven shaft gradually into rotation.

The invention is specially designed for use in connection with automobile clutches, although, obviously, it may be employed in other situations.

One of the main objects of the invention is to produce a device of this character which may be readily attached without requiring reconstruction of any of the parts of the clutch, clutch lever, or automobile.

Another object of the invention is to provide for regulating the speed at which the clutch will be moved in.

Another object is to provide for throwing out the clutch and permitting the clutch to be moved back in with its usual speed without being retarded by the pneumatic controlling device, this being of especial advantage when it is desired to shift the gears quickly. For example, in ascending a hill, it frequently becomes necessary to shift the gears to a lower speed and this must be done very quickly or the automobile, not having headway, will come to a standstill, and, if the pneumatic clutch controlling device were permitted to retard the closing movement of the clutch after this gear shift had been made, the time which would elapse before the clutch was fully in would be so great that the car would have lost too much headway. But this is avoided by the construction which is employed, as by moving the clutch lever forward a comparatively short distance, the clutch will be thrown out and the gears may be shifted quickly, then by releasing the clutch lever the clutch will be moved back quickly into engagement. This short movement of the clutch lever, while being sufficient to disengage the clutch, is not sufficient to cause the pneumatic retarding device to operate. Ordinarily, in the operation of the clutch, the clutch lever will be moved forward its full throw which will bring the retarding device into operation and it is only in conditions of emergency, such as above shown, where it is desired to operate the clutch without the retarding effect produced by the pneumatic controlling device. Thus, it will be seen that although the clutch is equipped with the pneumatic controlling device, the clutch is nevertheless under the complete control of the operator and may be operated either to be retarded by the pneumatic controlling device or not to be retarded thereby, as the conditions may require, either condition of operation being determined by the distance which the operator pushes the clutch lever forward, the full throw forward causing the pneumatic controlling device to operate and a short throw forward causing the clutch to operate without the controlling device affecting it.

Referring to the drawings: Figure 1 is a sectional view through a clutch, part of the clutch and the clutch lever being in elevation, the pneumatic controlling device being shown in elevation and connected to the clutch lever. Fig. 2 is a full size vertical section through the pneumatic controlling device. Fig. 3 is a section on line $x^3$—$x^3$ Fig. 2. Fig. 4 is a side elevation, partly in section, of the regulating disk. Fig. 5 is a section on line $x^5$—$x^5$ Fig. 4.

In the drawings, we have shown a clutch of the cone type, although, as will be obvious, a disk clutch or clutch of other design may be controlled by the device. The cone clutch consists of female member 1 and male member 2, the latter being secured by feather 3 to the driven shaft 4, the female member 1 being rigidly secured to the driving shaft 5. The member 2 has a grooved sleeve 6 which is engaged by the forked end 7 of a clutch lever 8 pivoted at 9. A collar 10 on the shaft 4 acts as an abutment for a compression spring 11, the other end of which bears against the sleeve 6, the spring 11 serving to exert a forward pressure against the sleeve 6 tending to move the member 2 into engagement with the member 1, except when the member 2 is moved out of engagement with the member 1 by operating the clutch lever 8. On the upper end of the clutch lever 8 is a pedal 12.

The pneumatic clutch controlling device may be secured in any desired situation to the automobile. In the drawing, we have shown it secured to the dash-board 13. The pneumatic clutch controller consists of a cylinder 14 with feet 15, by means of which it is attached to the automobile. Sliding within the cylinder 14 is a piston 16 of any suitable construction, preferably with a cup leather 17 on its upper face retained by a plate 18 and screws 19. A connecting rod 20 is pivoted at one end to the piston 16 and at the other end to a crank 21 formed on a shaft 22, which is journaled diametrically in the cylinder 14 and extends through one wall thereof and carries a segmental gear 23 which meshes with a segmental gear 24 on a shaft 25. Keyed to the shaft 25 and rotating therewith is a regulating disk 26 which is formed with a segmental notch 27. An adjusting screw 28 extends through the disk 26 and protrudes into the notch 27, as clearly shown in Fig. 4, a set-nut 29 being provided for locking the screw 28 in the position adjusted. Journaled on the shaft 25 is an arm 30 which lies within the notch 27 and has a movement therein relative to the disk 26, the degree of relative movement being regulated by the position of the screw 28. The arm 30 is connected by an arm 31 with the upper end of the clutch lever 8, as shown in Fig. 1. A head 32 is secured to the upper end of the cylinder 14 and is provided with a port 33 and a port 34, both of which communicate with a transverse passage 35 leading to the atmosphere. A needle valve 36 extends into the passage 35 and across the end of the port 34 and affords means for regulating the communication between port 34 and passage 35. The port 33 is always in full communication with passage 35. A valve 37 is carried on a lever 38 pivoted to a pair of lugs 39 which project below the head 32 and a screw 40 carried by the piston is adapted to strike the opposite end of the lever 38 to depress the valve 37 and open the port 33. A flat spring 41 prevents rattling of the lever 38 and assists in the closing movement of the lever, but is not strong enough to close the valve 37 unassisted.

In operation, the spring 11 normally holds the clutch members 1 and 2 in engagement, the clutch lever 8 being in position shown in full lines in Fig. 1, with the arms 30 and 31 extended and the piston 16 at the upper end of the cylinder. To release the clutch, the lever 8 is pushed forward. If it is only desired to release the clutch without causing the pneumatic controlling device to operate, this forward movement of the clutch lever should not cause the arm 30 to be oscillated farther than its free movement in the notch 27 and in such case upon the clutch lever 8 being released, the spring 11 will immediately move the clutch member 2 into engagement with the member 1, the arm 30 swinging back freely in notch 27 without retarding the closing movement of the clutch member 2. If, however, it is desired that the pneumatic controlling device be operated, the operator in releasing the clutch will push the clutch lever 8 its full throw forward into position shown in dotted lines in Fig. 1, which will cause arm 30 to strike against screw 28 and turn disk 26, thereby rocking shaft 25 and causing gears 24 and 23 to rock shaft 22 and crank 21 in a clockwise direction (Fig. 2), which, through crank 21 and connecting rod 20, will move down piston 16, the downward movement of the piston 16 being unrestrained by reason of the free entrance of air through passage 35 and port 33 to the upper end of the cylinder, the suction produced by the downwardly moving piston holding the valve 37 open. A vent 33' in the lower end of the cylinder prevents compression in the lower end of the cylinder. The clutch is held open so long as the clutch lever 8 is held in this position. When the clutch lever 8 is released, the spring 11 operates to disengage the clutch, which causes the piston 16 to ascend, whereupon the air above the piston closes valve 37 and as the piston rises, the air above the piston is compressed, which retards the upward movement of the piston and through the before-described connections retards the closing movement of the clutch lever 8. This retarding movement is regulated by the speed at which the air can escape through the restricted port 34 which may be adjusted by regulating the needle valve 36, as before explained. The piston 16 thus moves up gradually and the clutch member 2 is thereby caused to automatically move into clutching engagement, so that no shock is imparted to any of the machinery. Just before the final closing movement, the screw 40 strikes the lever 38 and opens valve 37 quickly, which suddenly relieves the pressure above the piston and allows the clutch spring 11 to forcibly act and quickly move the clutch member 2 through this short final movement into intimate engagement with the member 1. This insures the positive engagement of the clutch members. This amount of quick final movement is regulated by causing the screw 40 to strike the lever 38 earlier or later, as desired, which is accomplished by adjusting the screw 40.

In order to house the gears 23 and 24, a casing 42 is provided.

With this device the automobile may be easily started on the high gear even when standing still as the clutch takes hold so gradually.

The needle valve 36 is so designed that one turn of its thumb screw 36' will open the port 34 sufficiently to allow unrestricted movement of the piston. This places the pneumatic controlling device in inoperative condition, allowing unrestricted movement of the clutch.

What we claim is:

1. In combination with a clutch lever, a pneumatic clutch controller comprising a cylinder, a piston therein, one of said members being provided with a port permitting the free entrance of air and with a port for the exhaust of air, a valve controlled by the piston for closing said inlet port while the piston is compressing, and an extensible connection from said piston to the clutch lever.

2. In combination with a clutch lever, a pneumatic clutch controller comprising a cylinder, a piston therein, ports for the inlet and exhaust of air from the cylinder, a crank shaft in the cylinder, a connecting rod between the crank shaft and piston, a gear on the crank shaft, another shaft on the cylinder, a gear on the latter shaft meshing with the first gear, a disk on the latter shaft, an arm journaled on the latter shaft and having a loose connection with the disk, and another arm connected to the first arm and adapted to be connected to the clutch lever.

3. In combination with a clutch lever, a pneumatic clutch controller comprising a cylinder, a piston therein, the cylinder having air inlet and exhaust ports, a lever pivoted in the upper end of the cylinder, a valve on one end of the lever adapted to close the inlet port, a screw in the piston for actuating said lever, a crank shaft in the cylinder, a connecting rod between the crank shaft and piston, another shaft, a gear on the crank shaft and a gear on the latter shaft meshing with the gear on the crank shaft, a disk on the latter shaft, an arm journaled on the latter shaft, said disk having a segmental notch which receives said arm and allows a limited movement thereof with respect to the disk, and another arm connected to the first arm and adapted to be connected to the clutch lever.

4. In combination with a clutch lever, a pneumatic clutch controller comprising a cylinder, a piston therein, the cylinder having air inlet and exhaust ports, a lever pivoted in the upper end of the cylinder, a valve on one end of the lever adapted to close the inlet port, a screw in the piston for actuating said lever, a crank shaft in the cylinder, a connecting rod between the crank shaft and piston, another shaft, a gear on the crank shaft and a gear on the latter shaft meshing with the gear on the crank shaft, a disk on the latter shaft, an arm journaled on the latter shaft, said disk having a segmental notch which receives said arm and allows a limited movement thereof with respect to the disk, a screw in said disk for adjusting said free movement of said arm, another arm connected to the first arm and adapted to be connected to the clutch lever, a transverse passage in said cylinder communicating with both of said ports and with the atmosphere, a needle valve extending into said transverse passage, said needle valve extending over the end of the exhaust port for regulating the passage of air therethrough.

In testimony whereof, we have hereunto set our hands at Los Angeles, California, this 28th day of April 1911.

WALTER D. NICKUM.
MARTIN CLAUSSEN.

In presence of—
G. T. HACKLEY,
FRANK L. A. GRAHAM.